(12) United States Patent
Fanucci et al.

(10) Patent No.: US 8,172,195 B2
(45) Date of Patent: May 8, 2012

(54) FOUNDATION ADAPTER SYSTEM

(75) Inventors: Jerome P. Fanucci, Lexington, MA (US); Michael McAleenan, Georgetown, ME (US); Andrew F. Paddock, Billerica, MA (US); Kirk E. Survilas, Peabody, MA (US)

(73) Assignee: KaZaK Composites, Incorporated, Woburn, MA (US)

( * ) Notice: Subject to any disclaimer, the term of this patent is extended or adjusted under 35 U.S.C. 154(b) by 992 days.

(21) Appl. No.: 10/948,599

(22) Filed: Sep. 23, 2004

(65) Prior Publication Data

US 2005/0072897 A1    Apr. 7, 2005

Related U.S. Application Data

(60) Provisional application No. 60/505,019, filed on Sep. 23, 2003.

(51) Int. Cl.
*F16M 11/20* (2006.01)
(52) U.S. Cl. ........................................ 248/647; 248/429
(58) Field of Classification Search ................. 248/646, 248/647, 429, 637; 410/104, 105
See application file for complete search history.

(56) References Cited

U.S. PATENT DOCUMENTS

| | | | | |
|---|---|---|---|---|
| 4,473,178 | A | * | 9/1984 | Bott ............................. 224/324 |
| 5,520,357 | A | * | 5/1996 | Payne et al. ................ 244/118.1 |
| 5,871,318 | A | * | 2/1999 | Dixon et al. .................. 410/105 |
| 6,068,214 | A | * | 5/2000 | Kook et al. ................ 244/118.1 |
| 6,260,813 | B1 | * | 7/2001 | Whitcomb ................. 248/503.1 |
| 6,286,289 | B1 | | 9/2001 | Powell et al. ................ 52/790.1 |
| 7,029,215 | B2 | * | 4/2006 | Dowty .......................... 410/105 |
| 7,070,374 | B2 | * | 7/2006 | Womack et al. .............. 410/104 |

* cited by examiner

*Primary Examiner* — Terrell McKinnon
*Assistant Examiner* — Steven Marsh
(74) *Attorney, Agent, or Firm* — Weingarten, Schurgin, Gagnebin & Lebovici LLP

(57) ABSTRACT

A tiedown system foundation adapter system provides greater flexibility in spotting equipment on a support surface. An adapter module includes a plate assembly that drops into a slotted track system and is slid along the track system until it fits into an attachment point that restrains the plate assembly from vertical pullout and motion transverse to the track. The plate assembly is then locked into position to restrain it from further translation along the track. An equipment fitting is translatably mounted with respect to the upper surface and attaches to a complementary attachment fitting on the bottom of a piece of equipment. By locating a number of modules in desired locations along the tracks and locating the equipment fitting in each module, a piece of equipment can be oriented in virtually any position and location in the space to be furnished. A deck system for a flush floor is also provided.

23 Claims, 20 Drawing Sheets

FOUNDATION ADAPTER SYSTEM

CROSS REFERENCE TO RELATED APPLICATIONS

This application claims priority under 35 U.S.C. §119(e) of U.S. Provisional Application No. 60/505,019, filed on Sep. 23, 2003, the disclosure of which is incorporated by reference herein.

STATEMENT REGARDING FEDERALLY SPONSORED RESEARCH OR DEVELOPMENT

The work leading to the invention received support from the United States federal government under SBIR Grant, Contract Nos. N00167-02-C-0005 and N00167-03-C-0015. The federal government may have certain rights in this invention.

BACKGROUND OF THE INVENTION

The use of commercial off-the-shelf (COTS) electronic equipment, consoles, and other furniture or accommodations aboard ships has been increasing. Equipment on a ship may be subjected to a variety of loading conditions, including shock, and the installation of such equipment must account for this loading, generally by fixing the equipment to the ship's deck. Much of the equipment being installed aboard ships during upgrades or reconfigurations is, however, no longer designed specifically for shipboard applications. Thus, the appropriate mechanical, electrical, and human interfaces must be reconciled, which can require a large effort. Toward this end, the Navy has adapted a modular foundation system based upon ISO Standard 7166 to several Navy ships, called "Shipboard Modular Arrangement Reconfiguration Technology" or the SMART track system.

The SMART track system includes ISO 7166 standard geometry slotted rails or tracks that are currently fabricated from either aluminum or steel and are installed in a parallel array at 12-inch transverse spacing track-to-track, with tiedown locations in the tracks at 1-inch spacing in the longitudinal direction. The slotted tracks are supported by a network of structural beams to the true deck. The space between the slotted tracks is filled by false deck panels, and the space between the false and true decks is used to accommodate electrical and other cables and connections. The track array provides a rectangular grid on the floor that allows easy spotting and installation for equipment items conforming to the track/tiedown spacing.

While considerable economies in equipment installation are possible using the SMART track system, an area of concern arises when a floor plan layout spots equipment or furniture in such a way that the attachment points lie between the tracks. In order to install equipment not conforming to the 12-inch×1-inch track/tiedown spacing, and to provide increased load capacity beyond that possible with a single track tiedown point, several distinct adapters have been developed. The necessity for adapters of various kinds has, however, several adverse effects upon the equipment installation. The increased installed equipment height associated with the multiple adapters changes seating, keyboarding, and viewing parameters from the original equipment design, which can cause ergonomic problems for those using the equipment. In addition, the adapters are complex, and considerable labor can be required to make the several levels of bolted attachments required from some arbitrary equipment base down to the foundation beams. Where equipment and furniture are closely packed in a compartment, it may be necessary to remove several pieces in order to access the adapter attachment bolts for the piece being added, removed, or modified, which can increase the costs of outfitting or retrofitting compartments with equipment.

SUMMARY OF THE INVENTION

The present invention provides a lightweight, low-cost, easily reconfigurable foundation adapter system for providing greater flexibility in spotting equipment on a tiedown system, an array or grid of tiedown points, on a support surface such as a floor or wall. The foundation adapter system provides a plurality of adapter modules that each supports a portion of a piece of equipment. For example, using a tiedown system of parallel tracks, four modules can be used to support four corners of a cabinet. The cabinet can be oriented at an angle to the tracks, and can be supported at points between the tracks.

In a preferred embodiment, an adapter module includes a plate assembly that drops into a slotted track system in the vicinity of the desired position. The plate assembly is slid along the track system until it fits into an attachment or tiedown point that restrains the plate assembly from vertical pullout and motion transverse to the track. The plate assembly is then locked into position to restrain it from further translation along the track, for example by a shear pin or locking bezel that also drops into place.

The plate assembly further includes an equipment fitting such as a captive slide member that translates along a slot in the upper surface. The captive slide member is restrained from vertically pulling out of the slot. A complementary fitting on the bottom of a piece of equipment attaches to the captive slide member.

By locating a number of plate assemblies in a desired location along the tracks and locating the captive slide member along the slot in each plate assembly, a piece of equipment can be oriented in virtually any position and location in the space to be furnished.

The foundation adapter system provides an increased load capacity to accommodate shock environments. The foundation adapter system also is simple, has a minimal number of parts, and is easy to install, with one level of attachment fittings for the equipment. The hardware is accessible for mounting the foundation adapter system to the tiedown system, and access to the tiedown system is unrestricted. One or several sizes of adapter modules can be used, each of which is securable to the tiedown system. The adapter modules add only a minimal height increase to the equipment. The adapter system is particularly suitable for accommodating shipboard COTS equipment to the standard foundation interface SMART Track mounting system.

The foundation adapter system also provides deck panels that fit adjacent to the foundation adapter modules to provide a floor flush with the adapter modules. The deck panels can be connected to the tiedown system via suitable fastening devices. In another embodiment, the tracks of a tiedown system can be integrally formed with the deck panels.

DESCRIPTION OF THE DRAWINGS

The invention will be more fully understood by reference to the following detailed description when considered in conjunction with the accompanying drawings, in which.

DETAILED DESCRIPTION OF THE INVENTION

Figure 1:
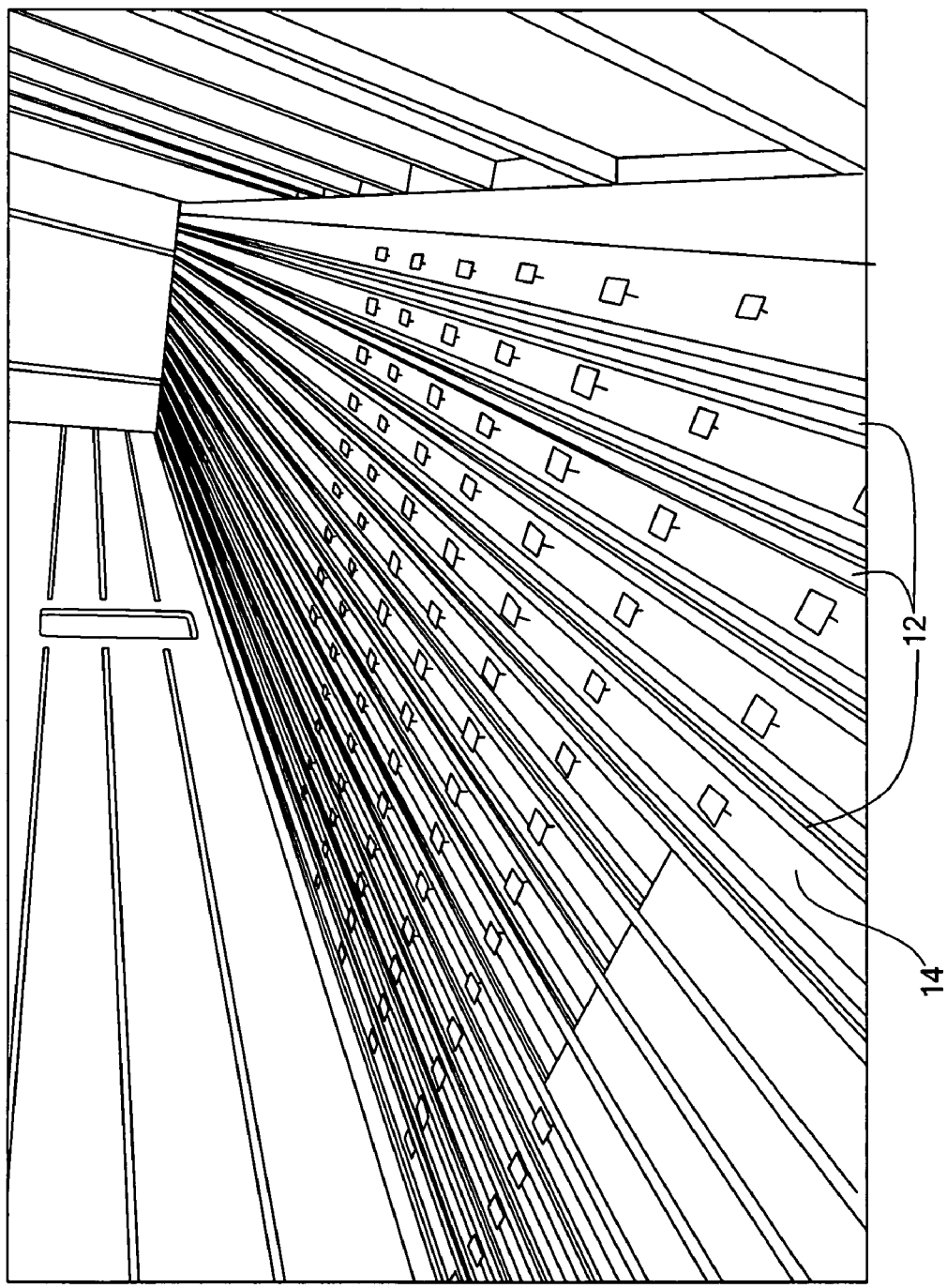
FIG. 1 illustrates a plurality of tracks or rails installed over a floor.
Figure 2:
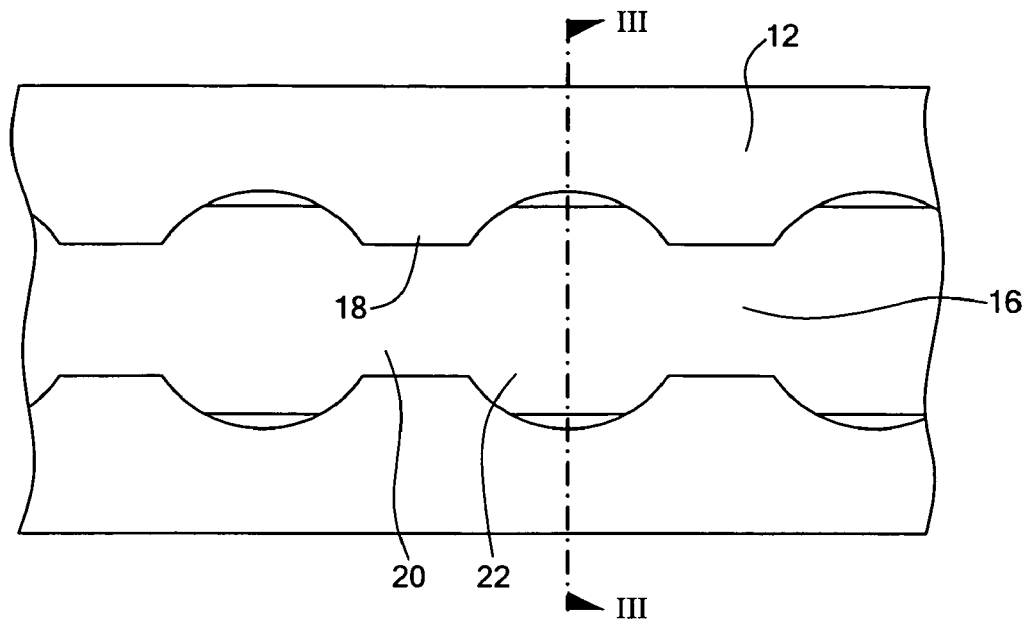
FIG. 2 is a partial top view of a single track of FIG. 1.
Figure 3:
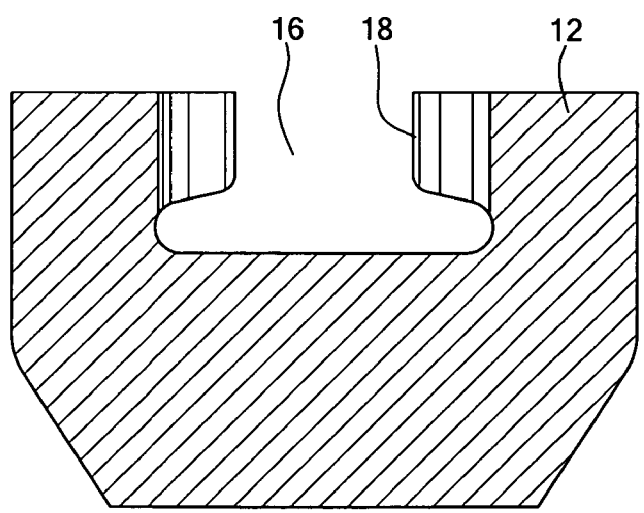
FIG. 3 is a sectional view along line III-III of FIG. 2.
Figure 28:
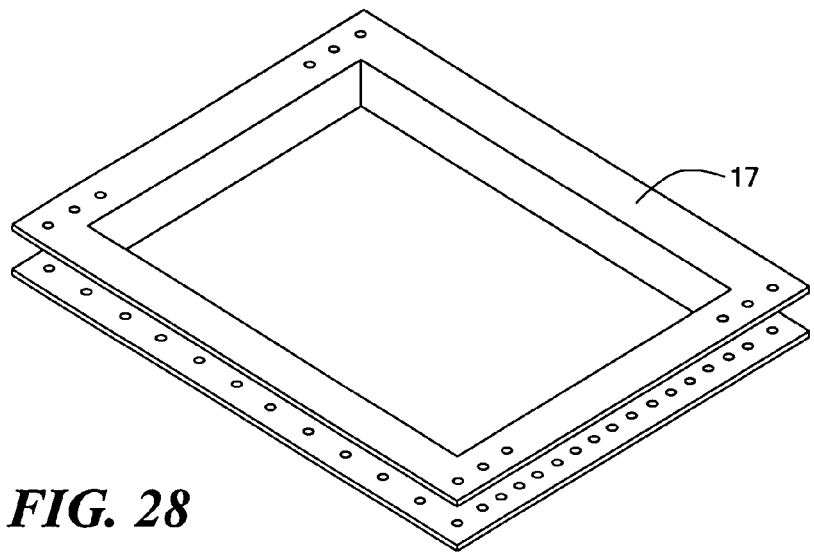
FIG. 28 is an isometric view of a foundation for a COTS piece of equipment.
Figure 29:
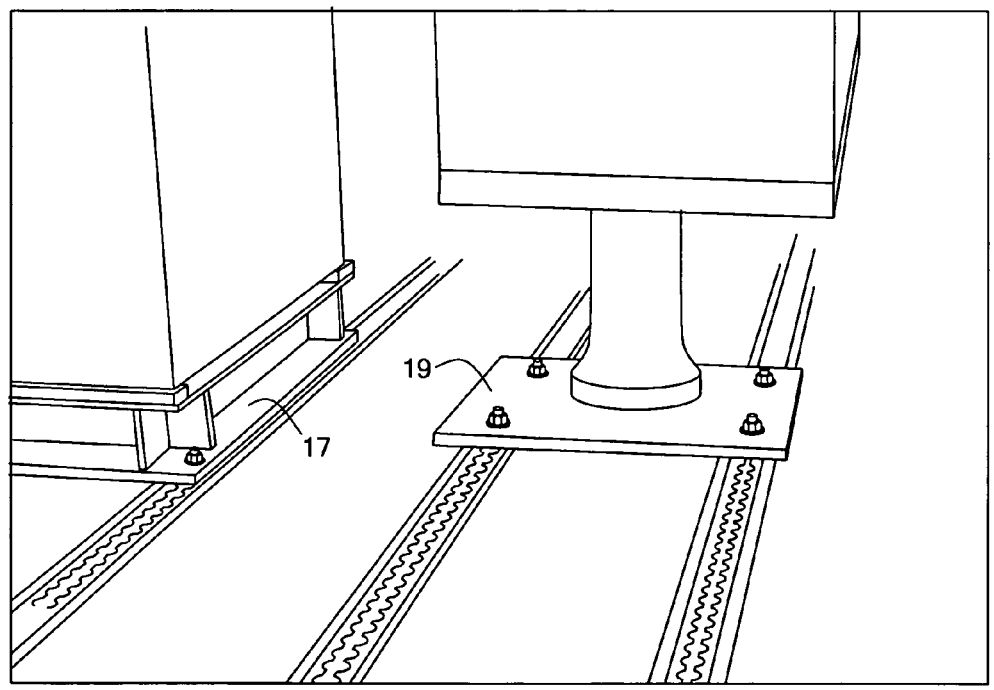
FIG. 29 is a perspective view of two foundations for COTS equipment.

FIG. 1 shows one form of tiedown system having a plurality of tracks or rails 12 installed over a floor or deck 14. The tracks are parallel to each other and spaced equidistantly. The tracks have attachment or tiedown points at determined intervals, such as every one inch. Referring to FIGS. 2 and 3, for the SMART track system, a slot 16 is formed the length of each track 12. A lip or flange 18 is formed along the opposite upper edges of the slot to provide narrow or necked portions 20 alternating with wide portions 22 at a one-inch pitch. The narrow portions 20 constitute attachment or tiedown points, as described further below. Each COTS piece of equipment is fitted with a structural foundation 17, 19. See FIGS. 28 and 29. Four tiedown points are located at the corners of the foundation. The foundation may be of any size and can accommodate any size piece of equipment.

Figure 4:
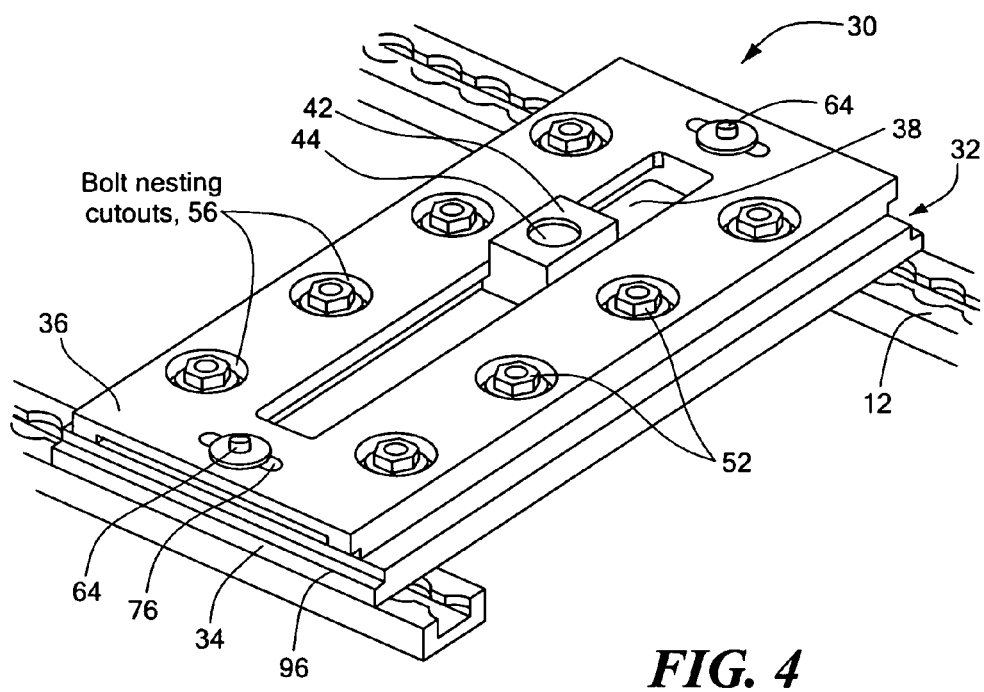
FIG. 4 illustrates an isometric view of an adapter module according to the present invention.

Referring to FIG. 4, an adapter module 30 of a foundation adapter system of the present invention includes a plate assembly 32 having a base or lower plate 34 and a slide or upper plate 36 fastened together. The plate assembly is fastened to the tracks in a manner described further below. To mount equipment to the plate assembly, a slot 38 is formed through the slide plate. An equipment fitting, such as a captive slide member or slider 42, fits within the slot for translation along the length of the slot. The captive slide member includes a threaded opening 44 or other fitting to attach to a complementary fitting on structural foundation 17, 19 on the bottom of the COTS equipment (see FIGS. 28 and 29) to be fastened to the floor. By moving the slider 42 along the slot 38, greater flexibility in spotting the equipment on the floor can be provided.

Figure 5:
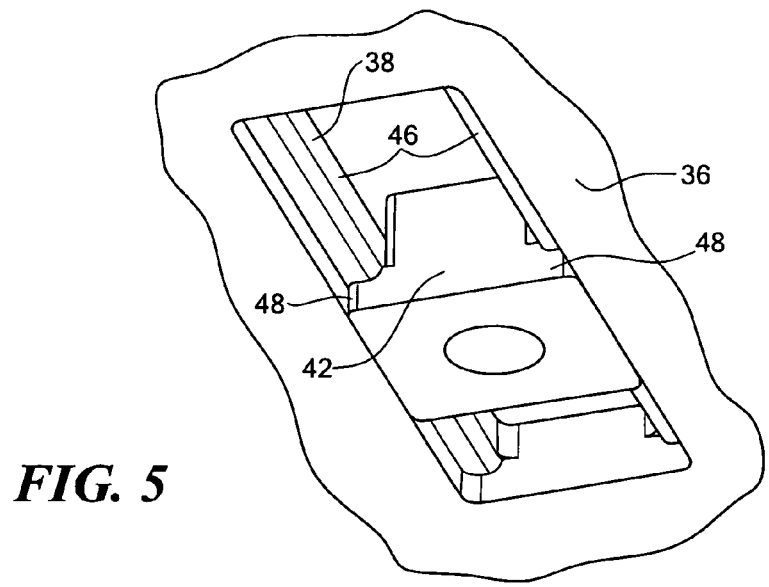
FIG. 5 is an isometric view of the underside of a slide plate of the adapter module of FIG. 4.

The captive slider 42 is restrained from vertical pull out from the slot 38. In the embodiment illustrated (see FIG. 5), the slot has a T-shaped cross-section with inwardly facing opposed flanges 46 along the upper face of the slide plate. The slider is configured as a correspondingly shaped T-nut, with the outwardly facing flanges 48 of the T-nut disposed beneath the inwardly facing flanges of the T-slot in the slide plate.

Figure 6:
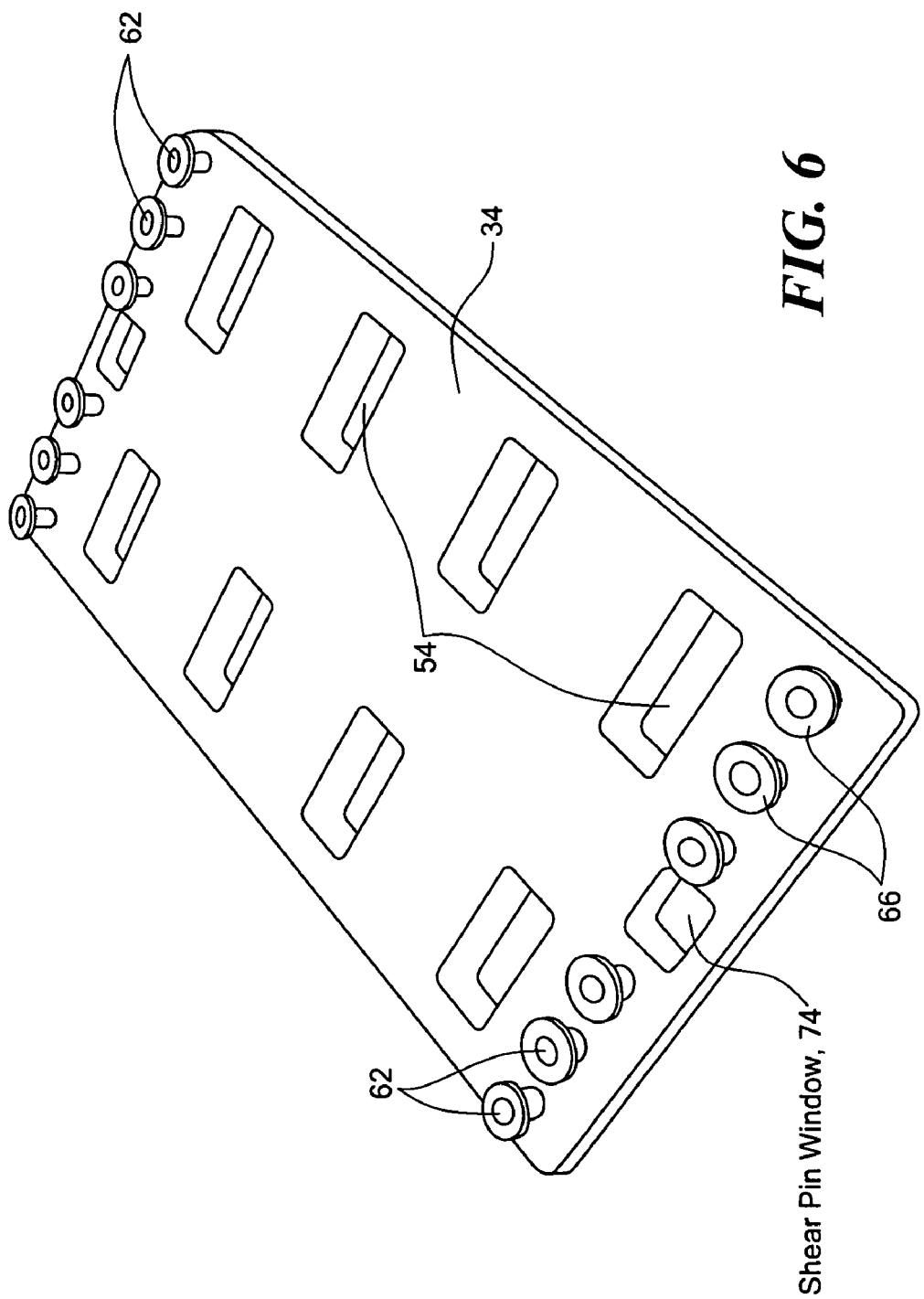
FIG. 6 is a perspective view of the underside of a base plate of the adapter module of FIG. 4.

The base plate 34 and the slide plate 36 are fastened together in any suitable manner, such as with a plurality of bolts 52, with adhesive, or with a combination of bolts and adhesive. Bolts are generally preferable for greatest strength and ease of assembly and allow the greatest positioning flexibility for the widest range of COTS equipment sizes. Preferably, the base plate includes flanged or T-shaped slots 54 for receiving the head of an associated bolt 52. (See FIG. 6.) The bolts protrude through aligned openings 56 in the slide plate, which preferably includes a recess to countersink a washer and nut below the upper surface of the slide plate 36 for tightening the bolt. The slots 54 in the base plate 34, which are preferably perpendicular to the slot 38 in the slide plate 36, allow the slide plate to be translationally positioned over the base plate before tightening the bolts, to provide additional flexibility in spotting equipment on the floor. For example, the captive slider 42 can be located between the 1-inch spacing of the attachment points set by the slotted track 12 by positioning the slide plate relative to the base plate.

The base plate 34 and the slide plate 36 can be manufactured of any suitable material, depending on the strength requirements of the application. For example, a metal such as aluminum or a composite material can be used. An aluminum casting is generally suitable for providing a strong plate assembly. The plates can be formed with a suitable grid pattern to reduce material and weight, as is known in the casting field.

Figure 7:
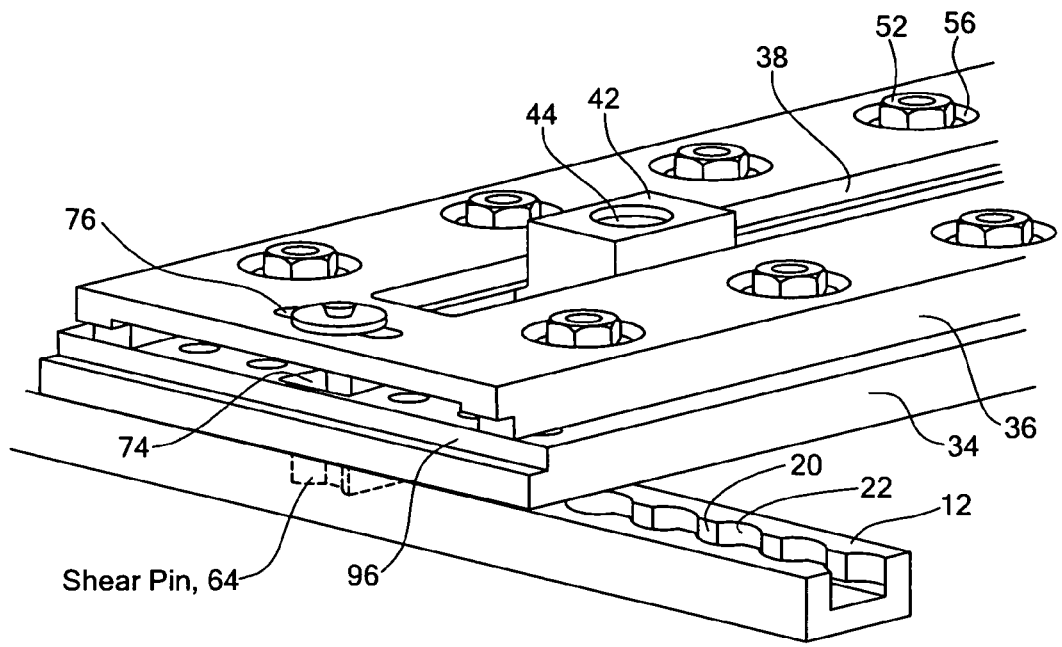
FIG. 7 is a partial isometric view of the adapter module of FIG. 4.
Figure 7A:
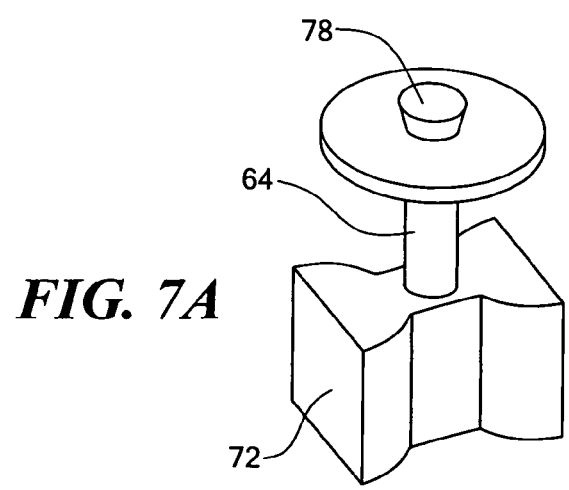
FIG. 7A illustrates the shear pin of FIG. 7.
Figure 8:
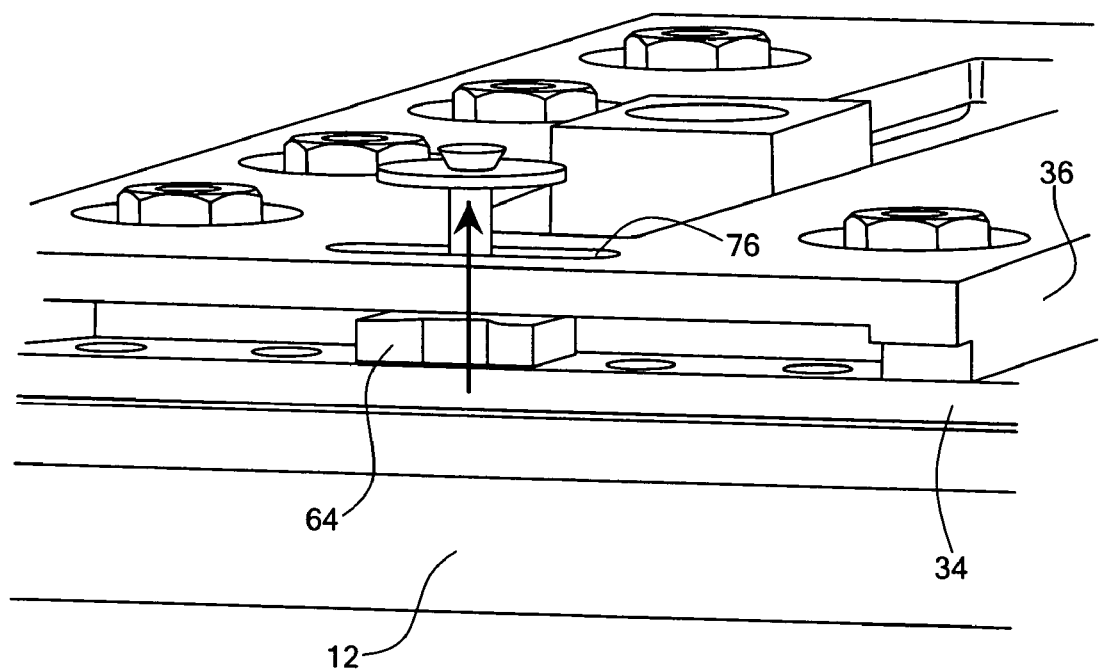
FIG. 8 is a partial isometric view of the adapter module of FIG. 4 illustrating the shear pin pulled out of the track.

The plate assembly is fixed to the tracks with a track fastening assembly that prevents vertical pullout and translation both transverse to the track and along the track. The track fastening assembly drops into place and slides along the track, so attachment is simple. In a preferred embodiment, the track fastening assembly includes a plurality of slidable members 62, such as T-buttons (FIG. 6), and one or more attachment studs 64, such as shear pins (FIGS. 7, 7A, and 8). The slidable buttons 62 restrain the plate assembly and attached equipment from vertical pullout and motion transverse to the track, while allowing the plate assembly to slide longitudinally along the track. The shear pins 64, once inserted, restrain the plate assembly and attached equipment from translation longitudinally along the track and act as set screws for the adapter module, preventing vibration of the module within and on top of the tracks.

In the embodiment illustrated, the slidable members 62 are in the form of T-buttons that extend downwardly from the base plate 34. (See FIG. 6.) A head 66 on each T-button fits through the wide portion 22 of the slot 16 of the track 12. The pitch of the T-buttons on the base plate is the same as the pitch of the wide portions of the track, so that the base plate can be inserted into the track at the wide portions 22 and then slid along the track to lie between the narrow portions 20. In this location, the plate assembly is restrained from vertical pullout from the track and from motion transverse to the track.

Referring to FIGS. 7, 7A, and 8, in the embodiment illustrated, the attachment stud 64 is formed as a shear pin that includes a threaded rod with a head portion 72 (shown bow-tie-shaped in the illustrated embodiment) that fits into the slot 16 in the track. The head portion has a depth and shape to prevent translation along the track. The depth is generally equivalent to the depth of the slot, so that, once inserted in the slot, the head portion cannot translate along the slot. The shape of the head portion may, for example, span the distance from the middle of one wide portion to the middle of an adjacent wide portion (a bow-tie shape) or the inner closing edge of one wide portion to the inner closing edge of another wide portion (a round or cylindrical shape). The shear pin extends above the head portion through a window 74 in the base plate 34 and an opening in the slide plate 36. A washer 78 aids in distribution of forces on the upper face of the slide plate. To unlock the plate assembly from translation along the track, the pin is lifted up or screwed up, removing the head portion from the slot in the track. (See FIG. 8.)

Figure 9:
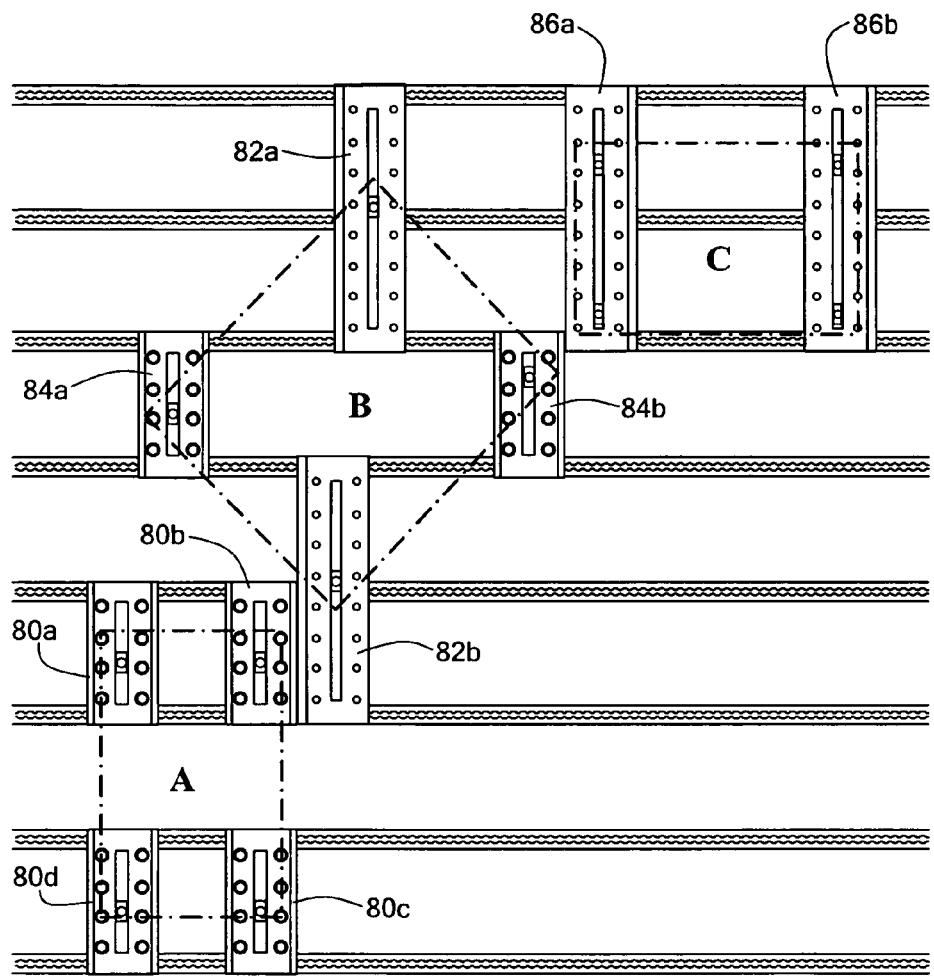
FIG. 9 is a plan view of a plurality of adapter modules spotting a number of cabinets on a track system.

The plate assembly of the foundation adapter module can be of any suitable size. For example, a plate assembly can span one track, two tracks, three tracks, or two and a half tracks. FIG. 9 illustrates a number of plate assemblies laid out on tracks to attach three pieces of equipment to the tracks. A first equipment cabinet A is fastened to four two-track adapter modules 80a, 80b, 80c, 80d. As can be seen, the T-nuts in each adapter module can be located to receive threaded mounting studs at each corner of the cabinet. A second equipment cabinet B is arranged at an angle to the tracks. Two opposite corners of the cabinet are attached to T-nuts on two three-track adapter modules 82a, 82b, while the remaining two corners are attached to T-nuts on two two-track adapter modules 84a, 84b. A third equipment cabinet C is attached on two three-track adapter modules 86a, 86b using two T-nuts in the slot on each adapter module. In another variation, corners of two separate cabinets can share a single adapter module by providing two T-nuts in a single slot. For example the corners of cabinets A and B could share adapter module 82b in FIG. 9. It will be appreciated that a great variety of equipment layouts can be provided by choosing the appropriate size of adapter modules, locating the adapter modules appropriately on the tracks, and sliding the T-nuts along the slots to accommodate the equipment cabinets.

Figure 10A:
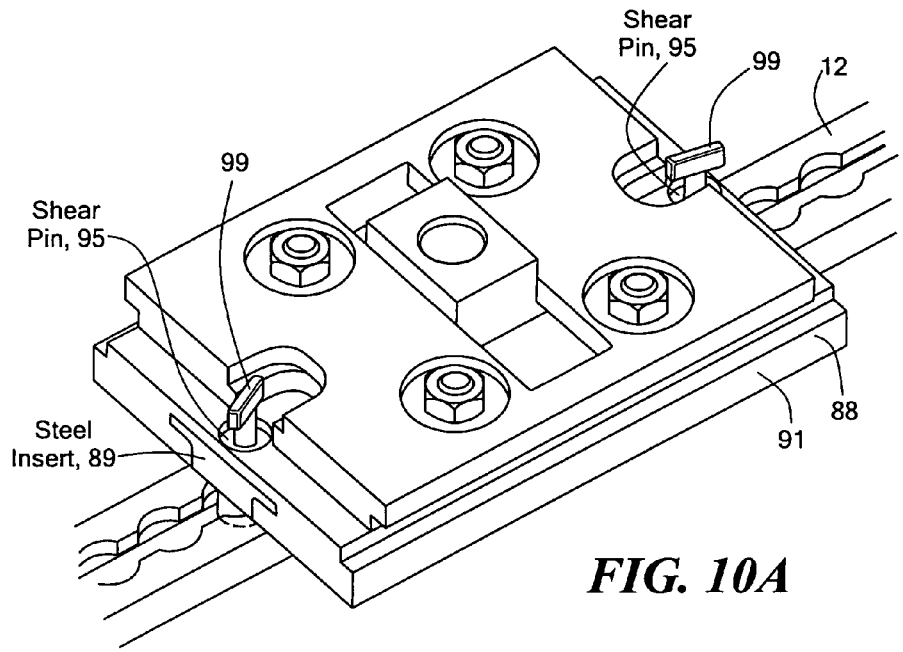
FIG. 10A is an isometric view of a single-track adapter module of the present invention.
Figure 10B:
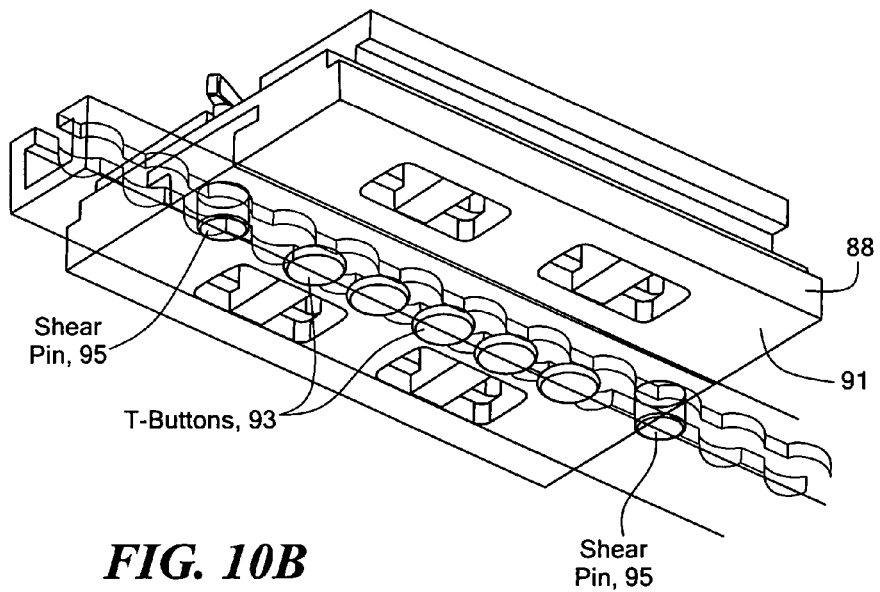
FIG. 10B is an isometric underside view of the single-track adapter module of FIG. 10A.
Figure 10C:
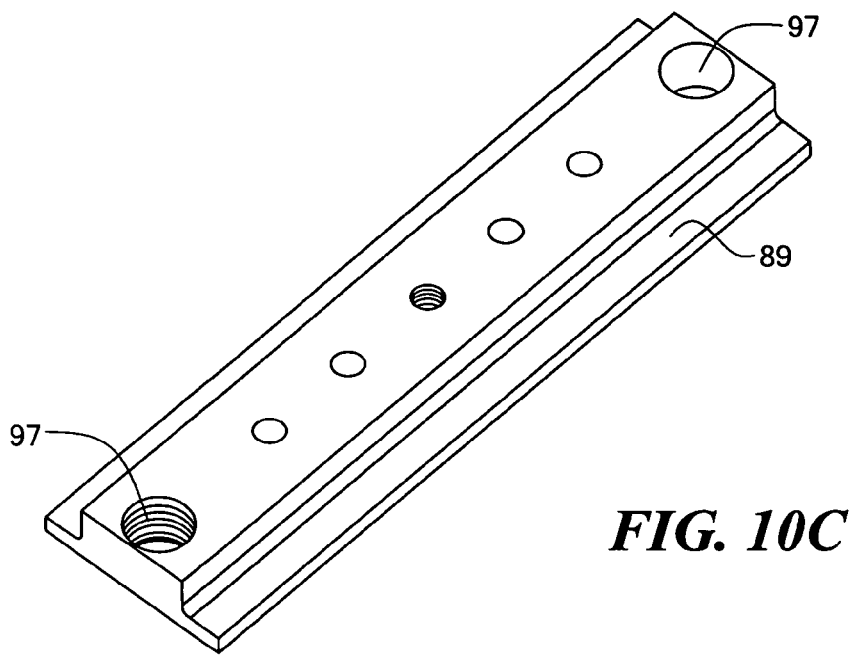
FIG. 10C is an isometric view of the insert of the adapter module of FIG. 10A.

A single-track adapter module 88 is illustrated in FIGS. 10A, 10B, and 10C. The single-track adapter module can replace the three-track adapter module. In this embodiment, a steel or other metal insert 89 is provided in the base plate 91 overlying the track 12 as an interface between the T-buttons 93 and the base plate, a region of high stress concentrations. The shear pins 95 screw through threaded openings in the insert. A thumb lever 99 is provided for screwing and unscrewing the shear pin. The shear pin can be screwed down until it strikes the bottom of the track and thus acts as a set screw of the system.

Figure 11:
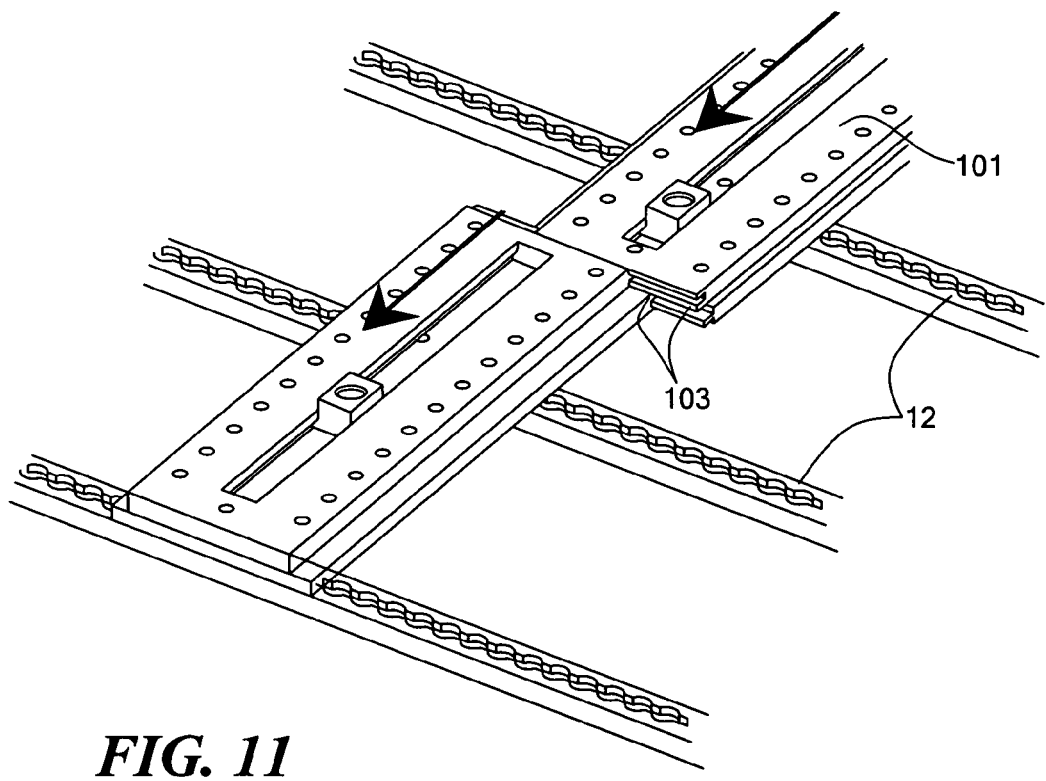
FIG. 11 is an isometric view of two two-and-a-half track adapter modules of the present invention.

FIG. 11 shows two two-and-a-half track adapter modules 101. Adjacent edges 103 can be formed to interlock, as with a dovetail joint, for extra strength and support.

Figure 12:
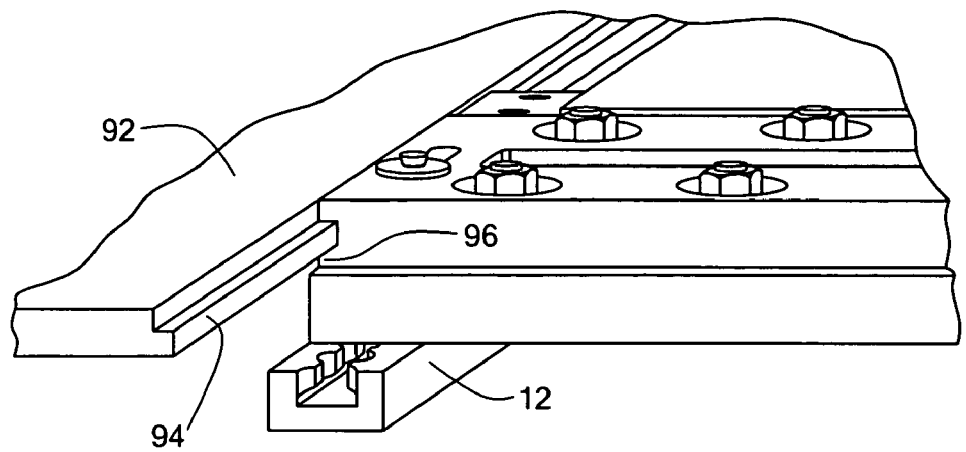
FIG. 12 is a partial isometric view of an edge detail of the adapter module of the present invention.
Figure 13:
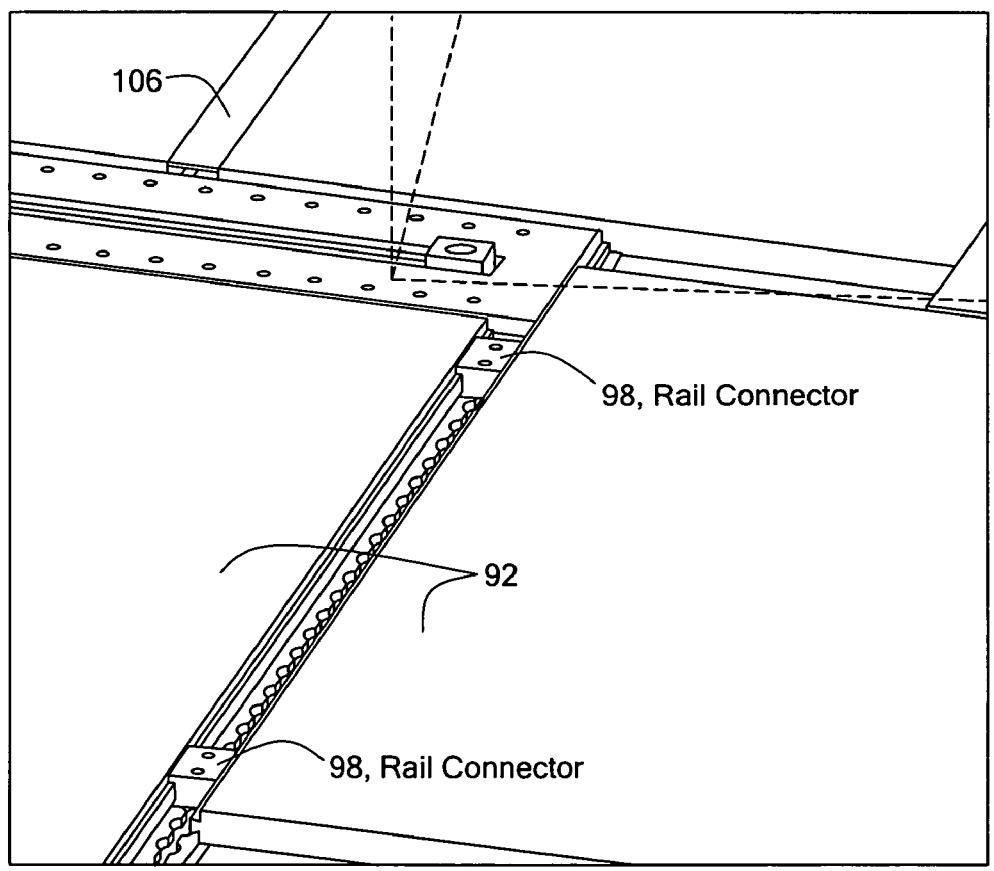
FIG. 13 is a partial isometric view of a plurality of deck panels of the present invention.
Figure 14:
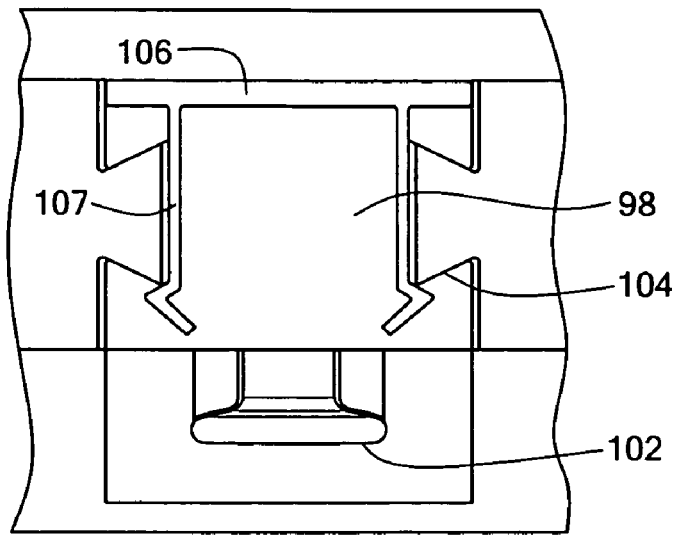
FIG. 14 is a side view of a rail connector of the present invention.
Figure 15:
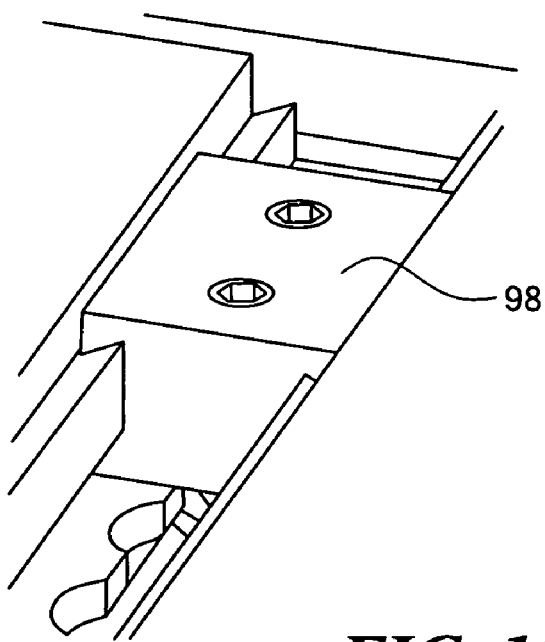
FIG. 15 is an isometric view of the rail connector of the present invention.

Because the adapter module is raised slightly above the tracks, the spaces between the tracks 12 can be filled in with panels 92 to form a flush floor above the level of the tracks, even with the adapter module. (See FIGS. 12 and 13.) To accommodate the panels, a feature 92 such as a lip, groove, or dovetailed slot is formed along edges of the panels, and a corresponding feature 96 is formed along the edges of the plates of the adapter module. The lip or flange can also extend along the bottom of the panels so that the lip or flange rests on the track itself. The groove can be formed in one of the two plates, for example, the upper plate, as shown in FIG. 12. Alternatively, the groove can be formed by flanges or lips in both plates, as shown in FIG. 4. Rail connectors 98 that fasten to the tracks 12 fit between the panels 92 to maintain the panels in position. The rail connectors fasten to the tracks with captive members 102, such as T-buttons that can be tightened to the tracks, and include sides 104 having features such as grooves or dovetails to receive the panels, as best illustrated in FIG. 14. Track covers 106 are placed over exposed sections of track 12 and the rail connectors 98. The track covers can include arms 107 that snap over the rail connectors to hold them in place. In this way, a flush floor is provided.

Figure 16:
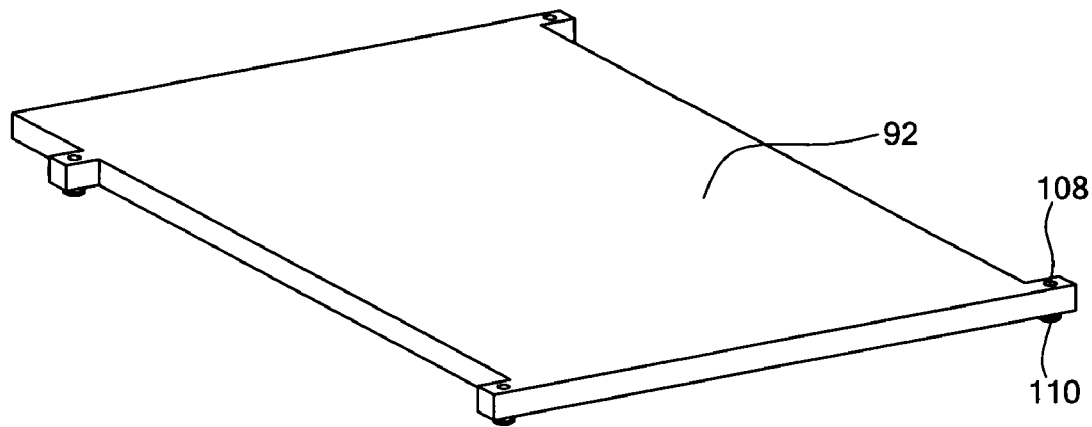
FIG. 16 is an isometric view of a further embodiment of a deck panel of the present invention.

FIG. 16 illustrates a further embodiment of deck panels that fit between adapter modules. The deck panels 92 include integrally formed hands 108 with captive members 110, such as T-buttons, that fit into the slots of the tracks to retain the panels therein. The deck panels can be formed in any suitable manner, such as by pultrusion of a composite material. In this case the hands can be machined into the deck panel after the panel exits the pultrusion die.

Figure 17:
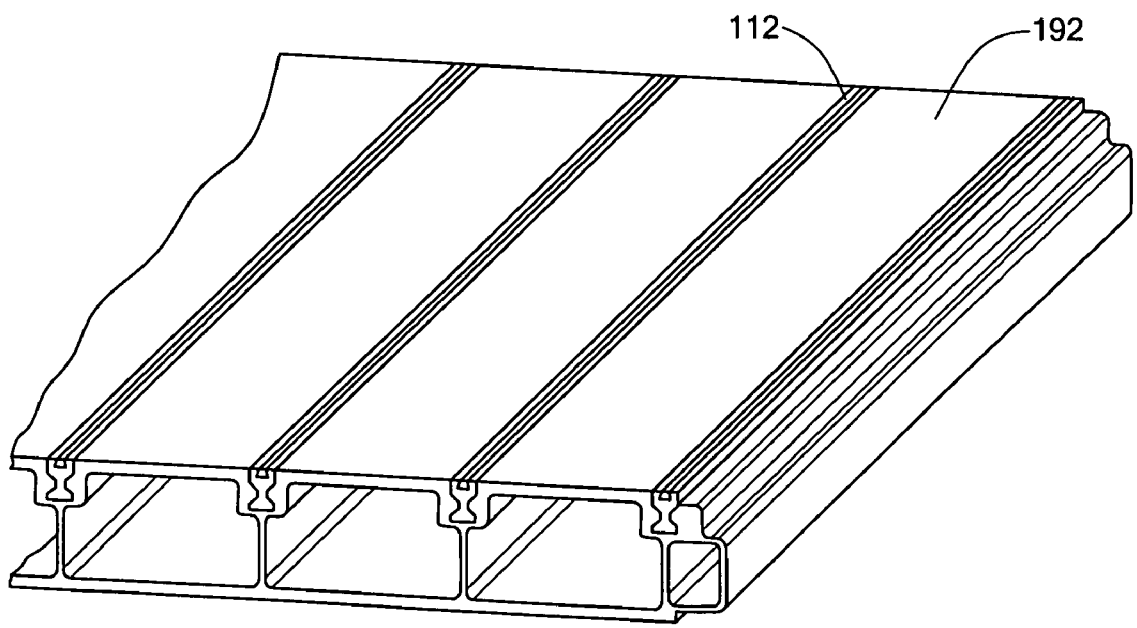
FIG. 17 is a partial isometric view of integrally formed tracks and deck panels of the present invention.
Figure 18:
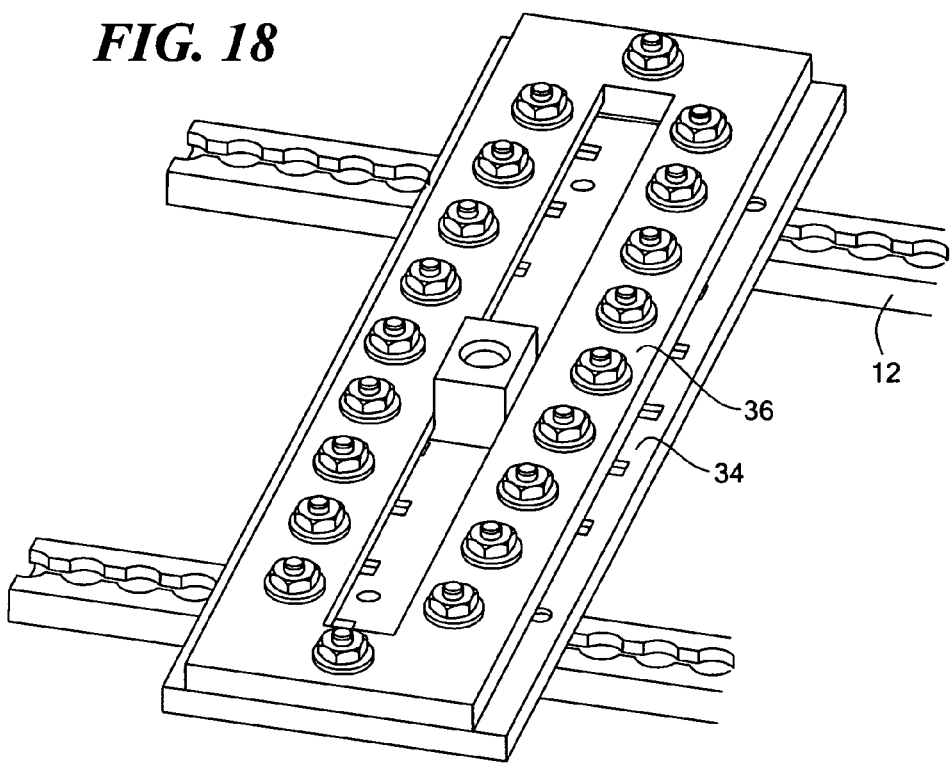
FIG. 18 is an isometric view of a further embodiment of an adapter module of the present invention.

In another embodiment, tracks 112 can be formed integrally with deck panels 192, as illustrated in FIG. 17. In this embodiment, the deck panels can be readily formed by a pultrusion process, and the axial tracks can be inserted into the pultrusion die as the panels are being manufactured.

Figure 19:
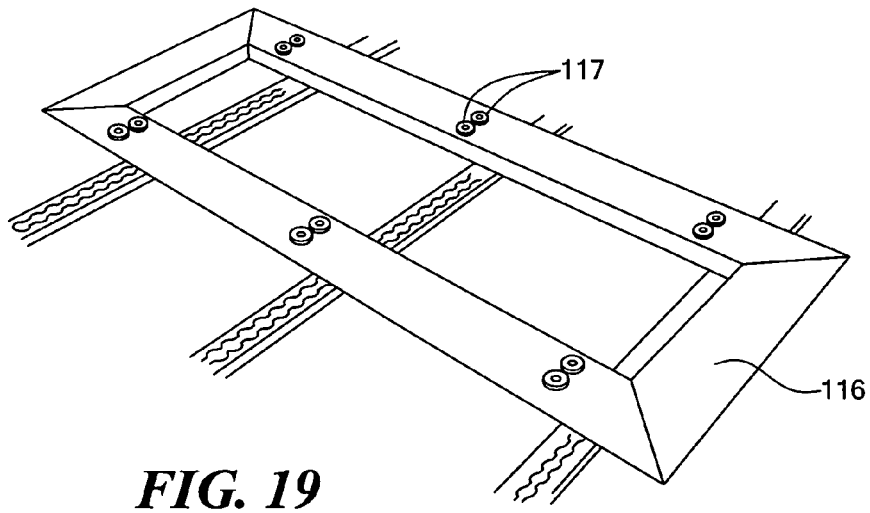
FIG. 19 is a perspective view of an underside of a locking bezel for use with the adapter module of claim 18.
Figure 20:
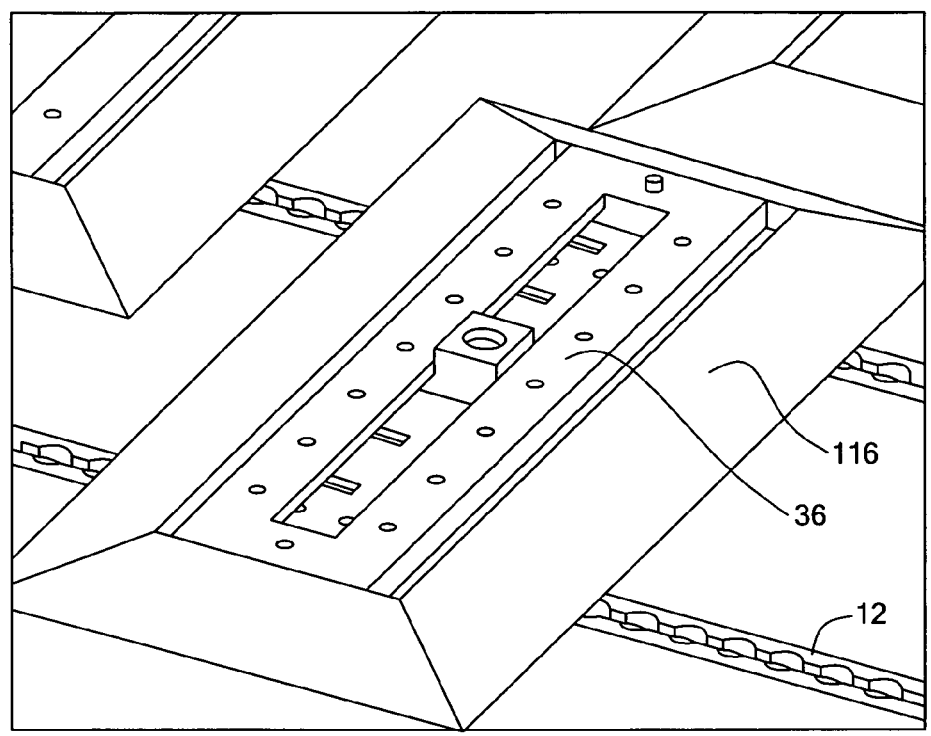
FIG. 20 is an isometric view of the adapter module of FIGS. 18 and 29.
Figure 21:
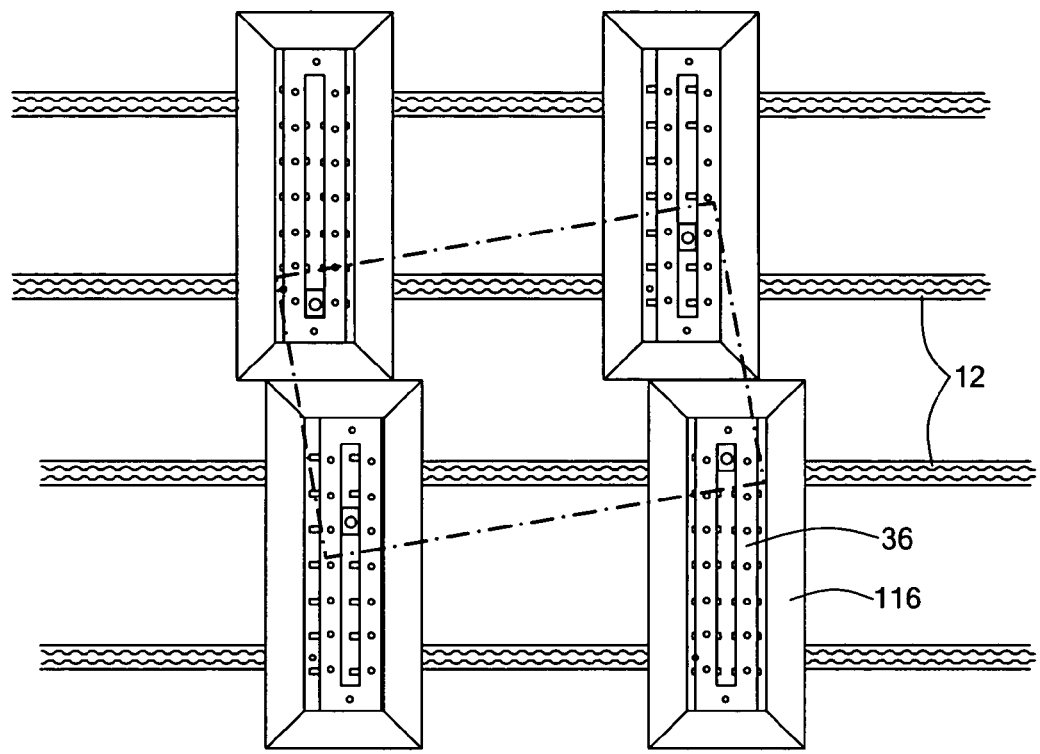
FIG. 21 is plan view of a plurality of adapter modules of FIG. 20 spotting a cabinet on a track system.
Figure 22:
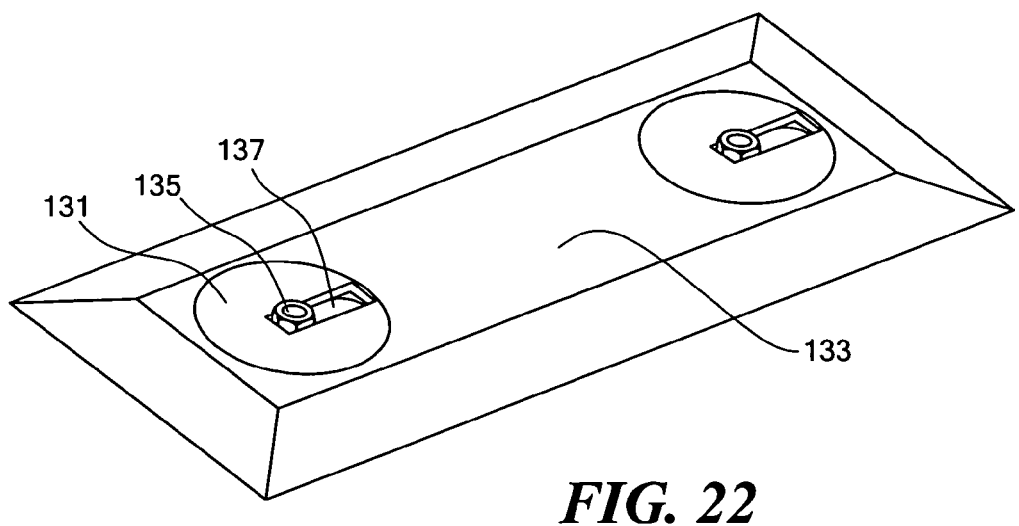
FIG. 22 is an isometric view of a still further embodiment of an adapter module incorporating rotating disks of the present invention.
Figure 24:
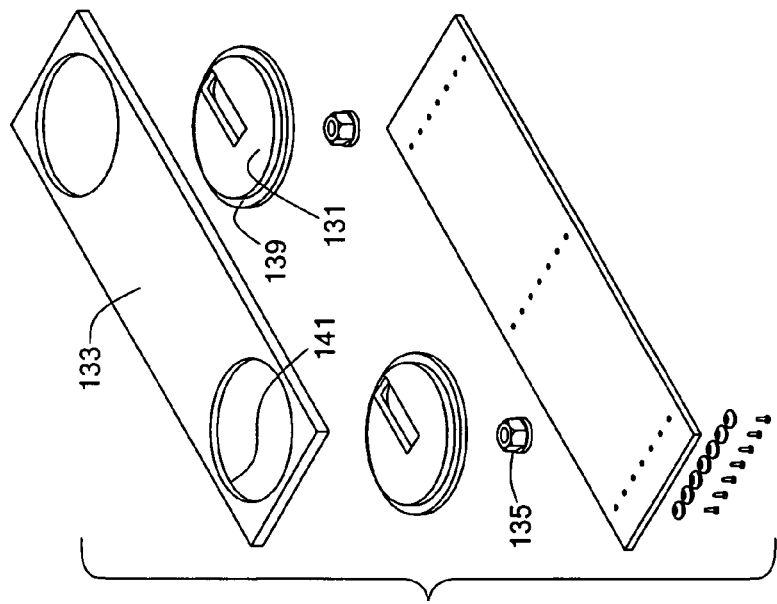
FIG. 24 is an exploded view of the plate assembly of the adapter module of FIG. 22.
Figure 23:
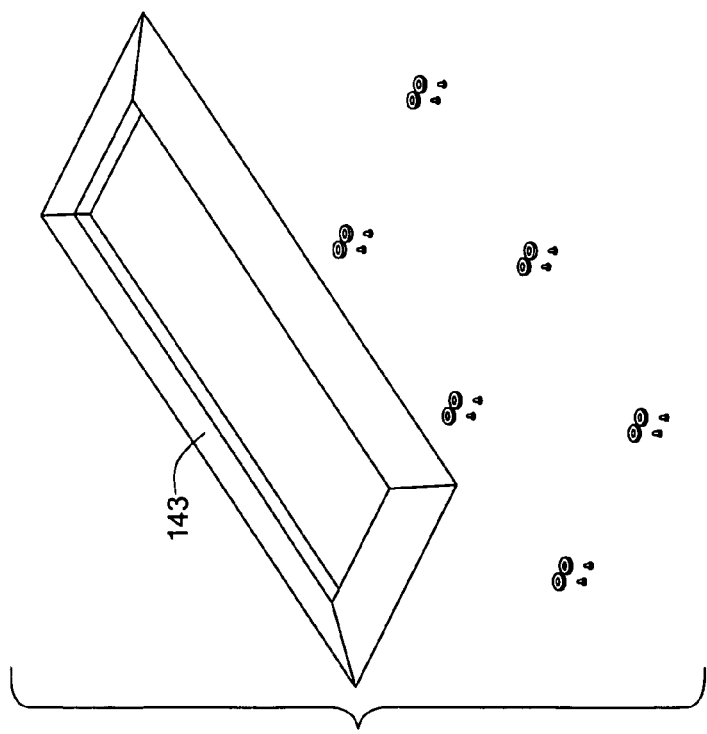
FIG. 23 is an exploded view of the bezel of the adapter module of FIG. 22.
Figure 25:
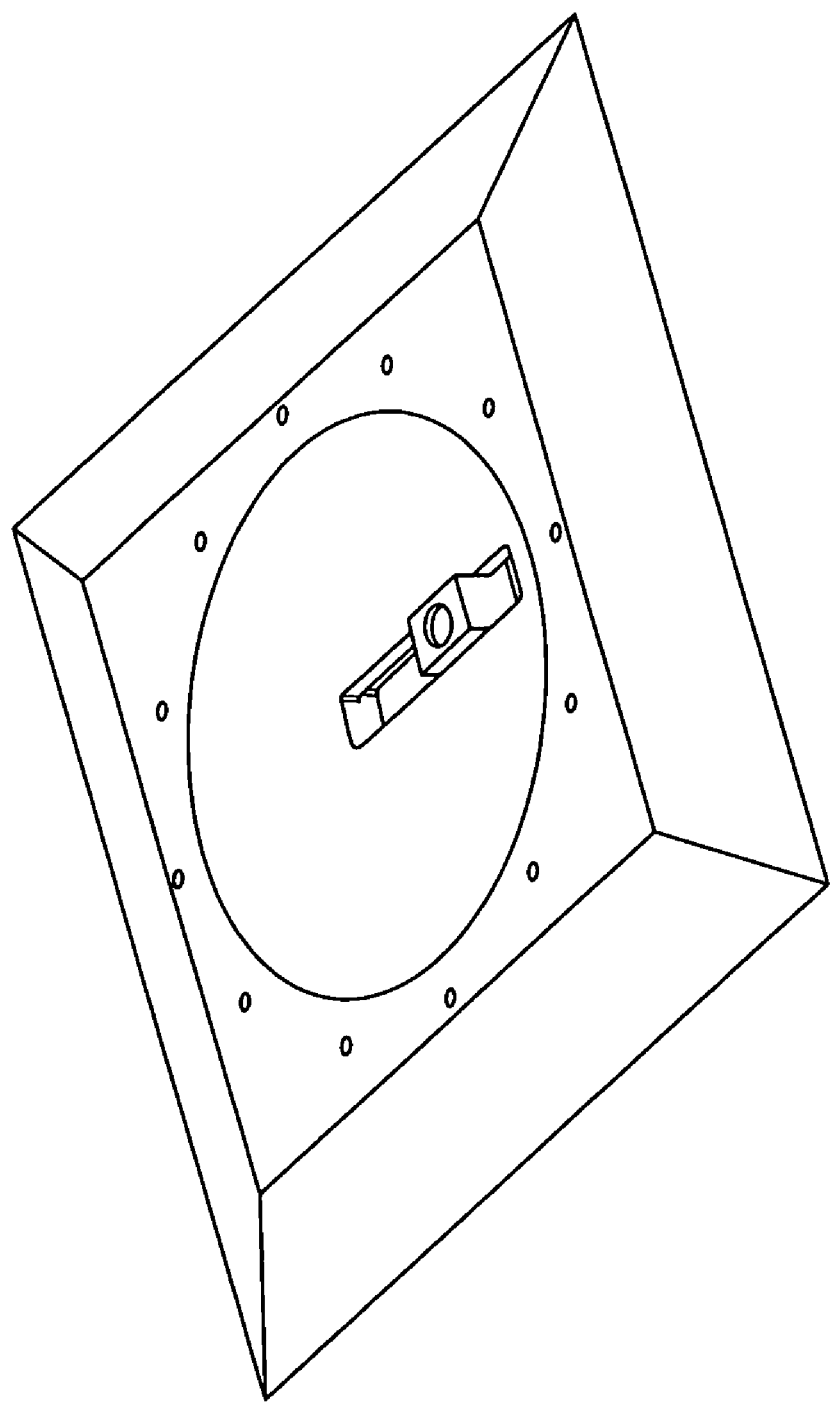
FIG. 25 is a partial isometric view of a still further embodiment of an adapter module incorporating a single rotation disk.
Figure 26:
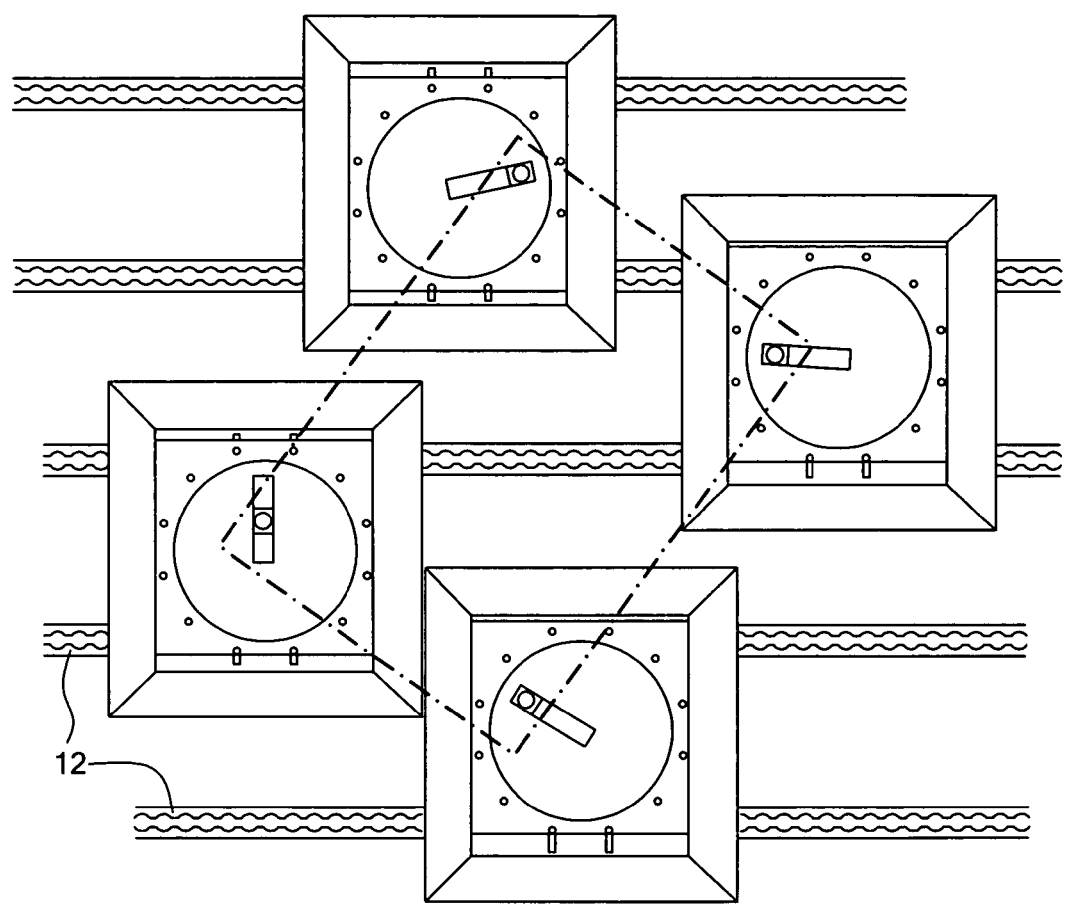
FIG. 26 is a plan view of a plurality of adapter modules of FIG. 25 spotting a cabinet on a track system.
Figure 27:
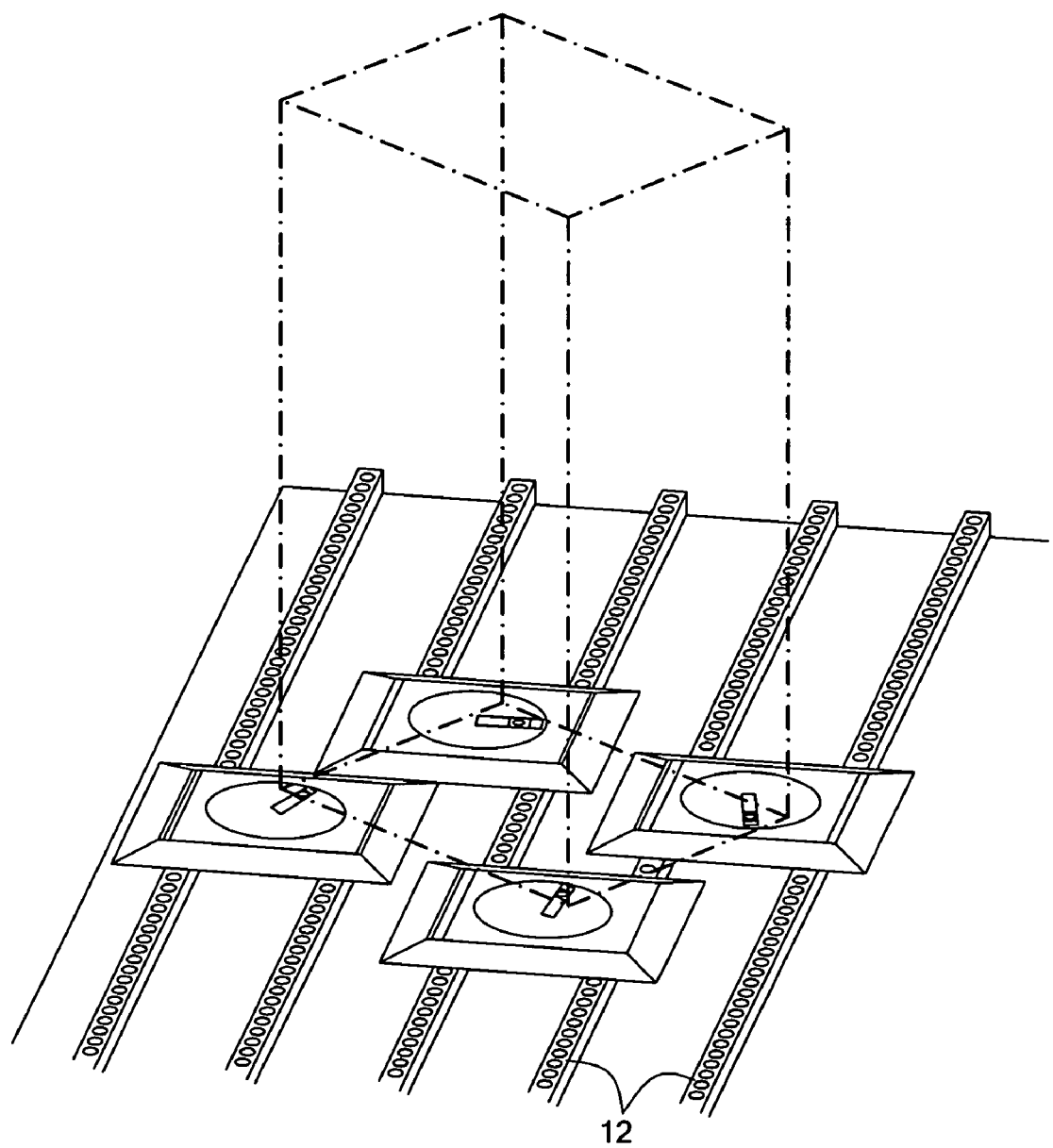
FIG. 27 is an isometric view of a plurality of adapter modules of FIG. 25 spotting a cabinet on a track system.

FIGS. 18-21 illustrate a further embodiment of a foundation adapter module of the present invention incorporating a bezel 116 circumferentially surrounding the plate assembly to provide a transition from deck panels between the tracks 12 and to lock the plate assembly in place on the tracks in lieu of the shear pins described above. The base plate of the adapter module incorporates slider members 62, as described above to restrain the plate assembly from vertical pullout and motion transverse to the track. Referring to FIG. 19, the underside of the bezel is provided with attachment studs 117 that fit within the wide portions of the slot 16 of the track 12 to restrain the plate assembly from translation along the tracks. Thus, to attach the adapter module to the tracks, the plate assembly is dropped into the track with the slider members fitting between the wide portions of the slot, and the plate assembly is then slid along the track until the slider members fit between the narrow portions of the slot. Then, the bezel is dropped into place over the plate assembly, thereby locking the plate assembly to the track. It can be seen that the adapter module embodiment of FIGS. 18, 20, and 21 spans two tracks, whereas the bezel embodiment illustrated in FIG. 19 spans three tracks.

FIGS. 22-27 illustrate an embodiment in which one or more rotatable disks 131 are mounted within the upper plate 133. The captive nut 135 slides within a slot 137 in the disk. The disk includes a stepped diameter 139 (see FIG. 24) and the upper plate 133 includes a correspondingly stepped diameter opening 141 to retain the disk from vertical pullout. By rotating the disk and sliding the nut along the slot, the equipment attachment point can be placed in a variety of locations between the tracks and between the attachment points of the tracks. A locking bezel 143 fits over the adapter plate assembly, as described above. Alternatively, the plate assembly could be fastened to the track in another manner, such as with a shear pin as described above.

It will be appreciated that the foundation adapter system of the present invention can be modified to adapt to different tiedown systems from that described above. For example, the attachment or tiedown points of the tracks can be provided by other fittings, such as locking levers or strap devices. A grid structure with a two-dimensional array of tiedown points can be provided rather than a system of parallel tracks. In the case of a grid system of tiedown points, rather than a system of parallel tracks, the slidable restraining members may, for example, not be necessary in addition to the attachment studs, as long as motion in the plane of the tiedown system can be restrained by, for example, the studs. The tiedown system can be located on a wall or other support surface in addition to the floor. The invention is not to be limited by what has been particularly shown and described, except as indicated by the appended claims.

What is claimed is:

1. A foundation adapter module for use with a track system having regularly spaced attachment points along regularly spaced parallel tracks, to mount a piece of equipment to the track system, comprising:
   a plate assembly;
   a captive slide member movably disposed in a slot in an upper surface of the plate assembly, the captive slide member including a fitting configured to attach to a piece of equipment;
   one or more slidable restraining members disposed on the plate assembly and configured to fit to the attachment points of the track system to restrain the plate assembly from vertical pullout from the track system and motion transverse to the track system, the slidable restraining members permitting sliding motion of the plate assembly along a respective track; and
   one or more locking members disposed on the plate assembly at a location configured to attach to the respective track in which at least one of the restraining members fits, to restrain the plate assembly from sliding motion along the respective track, each of the one or more locking members in linear alignment with at least one of the restraining members in a vertical plane defined through the respective track.

2. The module of claim 1, wherein the plate assembly comprises a base plate and an upper plate fastened together.

3. The module of claim 2, wherein the upper plate is adjustably fastened to the base plate.

4. The module of claim 2, wherein the upper plate is fastened to the base plate with a plurality of bolts, the bolts passing through slots in the base plate, whereby the position of the upper plate relative to the base plate is adjustable.

5. The module of claim 1, wherein the captive slide member comprises a T-shaped nut disposed in a correspondingly T-shaped slot in the upper plate.

6. The module of claim 1, wherein the slot in the upper surface is T-shaped in cross-section, and the captive slide member comprises a corresponding T shape.

7. The module of claim 1, wherein the captive slide member is disposed in a rotatable disk in the upper surface.

8. The module of claim 1, wherein the captive slide member is disposed in a slot in a rotatable disk in the upper surface.

9. The module of claim 8, wherein the slot in the rotatable disk is T-shaped in cross-section, and the captive slide member comprises a corresponding T shape.

10. The module of claim 1, further comprising a second captive slide member movably disposed on the upper surface, the second captive slide member including a fitting configured to attach to a piece of equipment.

11. The module of claim 1, wherein the one or more slidable restraining members comprise T-shaped buttons including heads that slide in a slot in the track.

12. The module of claim 1, wherein the locking member comprises a shear pin that extends from the plate assembly to a slot in the track, the shear pin having a head that fits within the slot to prevent motion along the track.

13. The module of claim 12, wherein the shear pin is liftable through an opening in the plate assembly to lift out of the slot in the track.

14. The module of claim 1, wherein the locking member comprises a bezel surrounding the plate assembly, the bezel comprising one or more T-shaped buttons including heads that fit within a slot in the track to prevent motion along the track.

15. The module of claim 14, wherein the bezel is tapered from a level of the track to the upper surface of the plate assembly.

16. A foundation adapter module for use with a track system having regularly spaced attachment points along regularly spaced parallel tracks, to mount a piece of equipment to the track system, comprising:
   a plate assembly comprising a base plate and an upper plate overlying the base plate, wherein the upper plate is adjustably fastened to the base plate;
   the upper plate is fastened to the base plate with a plurality of bolts, the bolts passing through slots in the base plate, whereby the position of the upper plate relative to the base plate is adjustable;
   a captive slide member movably disposed on an upper surface of the plate assembly, the captive slide member including a fitting configured to attach to a piece of equipment;
   one or more slidable restraining members disposed on the plate assembly and configured to fit to the attachment points of the track system to restrain the plate assembly from vertical pullout from the track system and motion transverse to the track system, the slidable restraining members permitting sliding motion of the plate assembly along a respective track; and
   one or more locking members disposed on the plate assembly and configured to attach to the track to restrain the plate assembly from sliding motion along the track.

17. The module of claim 16, wherein the captive slide member comprises a T-shaped nut disposed in a correspondingly T-shaped slot in the upper plate.

18. The module of claim 16, further comprising a second captive slide member movably disposed on the upper surface, the second captive slide member including a fitting configured to attach to a piece of equipment.

19. The module of claim 16, wherein the one or more slidable restraining members comprise T-shaped buttons including heads that slide in a slot in the track.

20. The module of claim 16, wherein the locking member comprises a shear pin that extends from the plate assembly to a slot in the track, the shear pin having a head that fits within the slot to prevent motion along the track.

21. The module of claim 20, wherein the shear pin is liftable through an opening in the plate assembly to lift out of the slot in the track.

22. The module of claim 16, wherein the locking member comprises a bezel surrounding the plate assembly, the bezel comprising one or more T-shaped buttons including heads that fit within a slot in the track to prevent motion along the track.

23. The module of claim 22, wherein the bezel is tapered from a level of the track to the upper surface of the plate assembly.

* * * * *